US009301278B2

(12) United States Patent
Hasegawa

(10) Patent No.: US 9,301,278 B2
(45) Date of Patent: Mar. 29, 2016

(54) POWER SUPPLY CONTROL CIRCUIT, POWER SUPPLY DEVICE, ELECTRONIC APPARATUS, AND POWER SUPPLY CONTROL METHOD

(71) Applicant: SOCIONEXT INC., Yokohama, Kanagawa (JP)

(72) Inventor: Morihito Hasegawa, Nagoya (JP)

(73) Assignee: Socionext Inc., Yokohama (JP)

( * ) Notice: Subject to any disclaimer, the term of this patent is extended or adjusted under 35 U.S.C. 154(b) by 32 days.

(21) Appl. No.: 14/162,527

(22) Filed: Jan. 23, 2014

(65) Prior Publication Data
US 2014/0210445 A1 Jul. 31, 2014

(30) Foreign Application Priority Data
Jan. 28, 2013 (JP) ................... 2013-013371

(51) Int. Cl.
*G05F 1/10* (2006.01)
*H04W 64/00* (2009.01)
*H04W 48/04* (2009.01)
(Continued)

(52) U.S. Cl.
CPC .......... *H04W 64/006* (2013.01); *H02M 3/1588* (2013.01); *H04W 48/04* (2013.01); *H04W 52/0277* (2013.01); *H02M 2001/0003* (2013.01); *H02M 2001/0009* (2013.01); *H02M 2001/0032* (2013.01); *Y02B 70/1466* (2013.01); *Y02B 70/16* (2013.01)

(58) Field of Classification Search
CPC ... H02M 1/38; H02M 3/1588; Y02B 70/1466

USPC .......... 323/207, 222, 224, 282–290; 363/16–20, 40, 60, 62
See application file for complete search history.

(56) References Cited

U.S. PATENT DOCUMENTS 6,870,354 B2* 3/2005 Nishimaki .............. H02M 1/38
323/224
6,936,997 B2* 8/2005 Mullett .............. H02M 3/1582
323/222
(Continued)

FOREIGN PATENT DOCUMENTS

CN 102457183 A 5/2012
EP 1503490 A1 2/2005
(Continued)

OTHER PUBLICATIONS

Taiwanese Office Action for Taiwan Application No. 103102501 dated May 13, 2015.
(Continued)

*Primary Examiner* — Rajnikant Patel
(74) *Attorney, Agent, or Firm* — Arent Fox LLP

(57) ABSTRACT

A control circuit includes a detection circuit configured to detect a load current flowing into a load, and a setting circuit configured to set switching operations on first and second switch circuits according to the load current. The setting circuit is configured to cause both the first switch circuit and the second switch circuit to be in an off state, when a power supply stop signal is input from an outside, if the load current is in a first range, and to cause the first switch circuit to perform an on-off operation on the basis of the output voltage while causing the second switch circuit to be in the off state, if the load current is higher than a first reference value that is an upper limit of the first range.

18 Claims, 7 Drawing Sheets

(51) Int. Cl.
 *H02M 3/158* (2006.01)
 *H04W 52/02* (2009.01)
 *H02M 1/00* (2007.01)

(56) References Cited

U.S. PATENT DOCUMENTS

| | | | |
|---|---|---|---|
| 7,193,401 B1 * | 3/2007 | Hasegawa | H02M 3/1588 |
| | | | 323/224 |
| 7,498,785 B2 * | 3/2009 | Shimizu | H02M 3/157 |
| | | | 323/282 |
| 7,609,039 B2 * | 10/2009 | Hasegawa | 323/273 |
| 7,714,557 B2 | 5/2010 | Hasegawa | |
| 7,733,074 B2 * | 6/2010 | Hasegawa et al. | 323/284 |
| 7,777,473 B2 * | 8/2010 | Hasegawa et al. | 323/284 |
| 7,821,236 B2 * | 10/2010 | Hasegawa et al. | 323/222 |
| 8,301,219 B2 * | 10/2012 | Chen | A61B 5/04085 |
| | | | 600/382 |
| 8,729,881 B2 * | 5/2014 | Chang | 323/285 |
| 2005/0212502 A1 | 9/2005 | Casey et al. | |
| 2006/0071651 A1 | 4/2006 | Ito | |
| 2008/0278129 A1 | 11/2008 | Shimizu | |
| 2010/0046250 A1 | 2/2010 | Noda | |
| 2012/0091981 A1 | 4/2012 | Komiya | |

FOREIGN PATENT DOCUMENTS

| | | |
|---|---|---|
| JP | 2006-33990 A | 2/2006 |
| JP | 2006-109535 A | 4/2006 |
| JP | 2008-67454 A | 3/2008 |
| JP | 4621448 B2 | 1/2011 |
| JP | 2012-060883 A | 3/2012 |
| TW | 200912586 A | 3/2009 |
| TW | 1351811 B | 11/2011 |

OTHER PUBLICATIONS

Taiwanese Office Action for Taiwan Application No. 103102501 dated Oct. 29, 2015, with partial English translation.
Chinese Office Action for China Application No. 201410035369.6 issued Dec. 29, 2015, with complete English translation.

* cited by examiner

| | S3 | S4 | Switching Operation |
|---|---|---|---|
| Light Load | L | H | Intermittent Switching Control On T1<br>Switching Control On T2 |
| Normal Load | L | L | Stop Switching Control On T1 And T2 |
| Heavy Load | H | L | Switching Control On T1<br>Stop Switching Control On T2 |

POWER SUPPLY CONTROL CIRCUIT, POWER SUPPLY DEVICE, ELECTRONIC APPARATUS, AND POWER SUPPLY CONTROL METHOD

CROSS-REFERENCE TO RELATED APPLICATIONS

This application is based upon and claims the benefit of priority from prior Japanese Patent Application No. 2013-13371, filed on Jan. 28, 2013, the entire contents of which are incorporated herein by reference.

FIELD

The present disclosure relates to a control circuit of a power supply, a power supply device, an electronic apparatus, and a power supply control method.

BACKGROUND

An electronic apparatus includes a switching power supply that supplies a load with power. The switching power supply is, for instance, a DC-DC converter that converts a DC voltage into another DC voltage. An electronic apparatus that includes various voltage sources with different voltage values may include multiple DC-DC converters for respective voltage sources. It is important to start up the multiple voltage sources in an appropriate order when an electronic apparatus is started, and to stop the multiple voltage sources in an appropriate order when the electronic apparatus is stopped. If the order of stating the voltage sources in the start sequence is inappropriate or the order of stopping the voltage sources in the stop sequence is inappropriate, the electronic apparatus may malfunction. For instance, a state may be maintained where a forward bias is applied to the p-n junction of a semiconductor device that is an element of an electronic apparatus, and unnecessary current may continue to flow (which is referred to as a latch-up phenomenon).

Thus, a method has been proposed that quickly reduces the output voltage of a DC-DC converter after the DC-DC converter is stopped (e.g., Japanese Patent Laid-Open No. 2006-109535, Japanese Patent No. 4621448). For instance, a soft stop technique has been proposed that provides an external capacitor and a discharging resistor are provided, and reduces the output voltage after a DC-DC converter is stopped. According to the soft stop technique, after the DC-DC converter is stopped, a charge accumulated in the capacitor starts to be discharged from the discharging resistor, and a terminal voltage of the capacitor is input into an error amplifier circuit. Accordingly, in the error amplifier circuit, a reference voltage to be compared with the output voltage gradually decreases, thereby allowing the output voltage of the DC-DC converter to gradually decrease. Furthermore, another technique is proposed according to which, in a synchronous rectifying DC-DC converter, after the DC-DC converter is stopped, a transistor on a main side is turned off while a transistor on a synchronous side is turned on, thereby allowing a charge accumulated in a capacitance element, such as an output capacitor, provided on a load side to be rapidly drawn, and allowing the output voltage to quickly decrease.

SUMMARY

Unfortunately, the soft stop technique requires a dedicated terminal to which the external capacitor is coupled, and a capacitor with a large capacity as the foregoing capacitor. Accordingly, a problem occurs that increases the circuit area of the entire DC-DC converter. According to the technique that utilizes the transistor on the synchronous side for discharge, if the load is a heavy load, the charge accumulated in the output capacitor is quickly discharged by the load and the transistor on the synchronous side. Accordingly, the output voltage of the DC-DC converter quickly decreases. The abrupt variation in output voltage may adversely affect the electronic apparatus.

According to an aspect of the invention, a control circuit of a power supply which generates an output voltage from an input voltage by performing on-off control on a first switch circuit that is turned on to accumulate energy in an induction element and on a second switch circuit that is turned on to discharge the energy accumulated in the induction element to a load coupled to an output terminal. The control circuit includes a detection circuit configured to detect a load current flowing into the load; and a setting circuit configured to set switching operations on the first switch circuit and the second switch circuit according to the load current. The setting circuit is configured to cause both the first switch circuit and the second switch circuit to be in an off state when a power supply stop signal is input from an outside, if the load current is in a first range, and, to cause the first switch circuit to perform an on-off operation on the basis of the output voltage while causing the second switch circuit to be in the off state, if the load current is higher than a first reference value that is an upper limit of the first range.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

DESCRIPTION OF EMBODIMENTS

Figure 1:
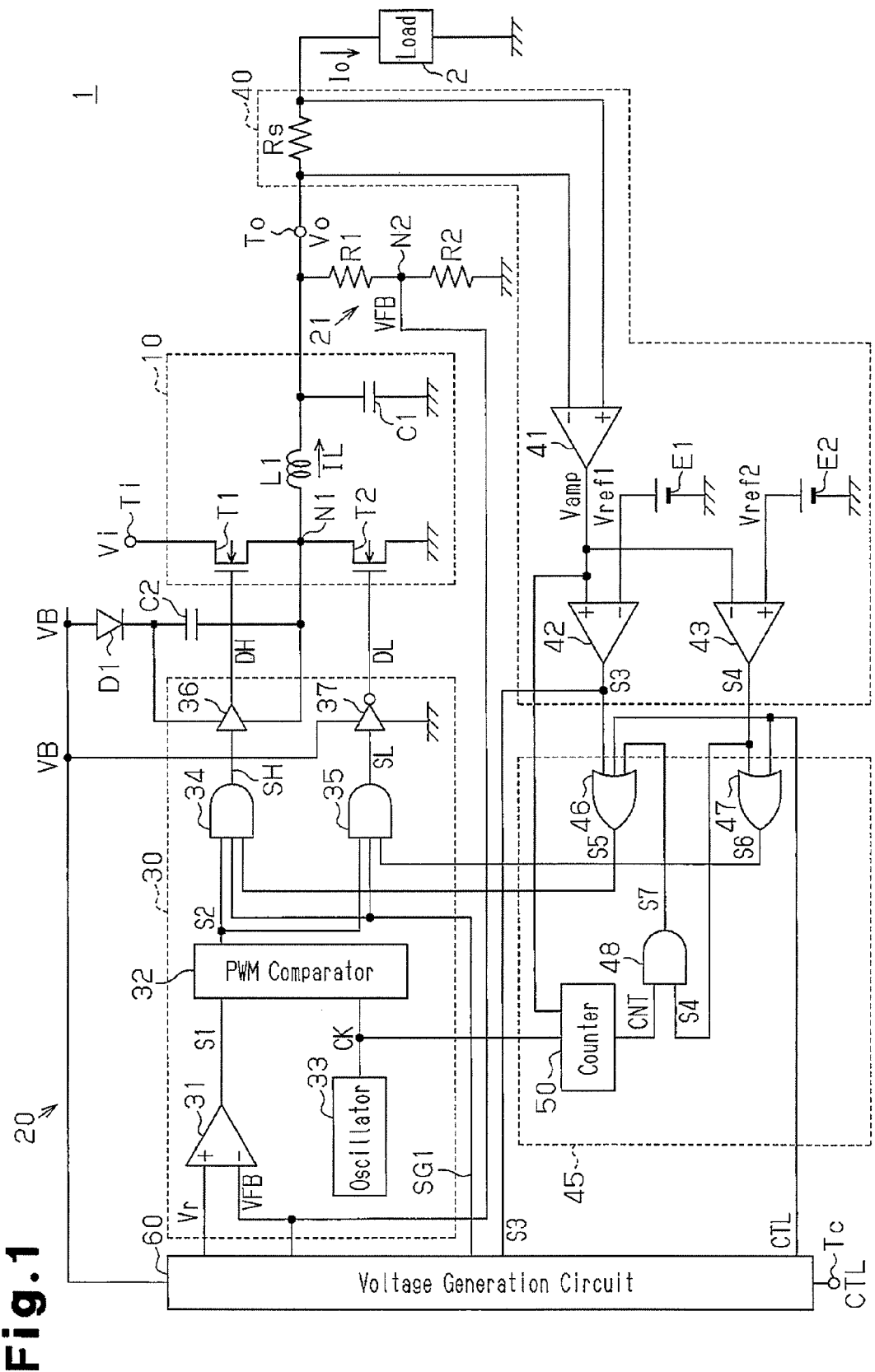
FIG. 1 is a block circuit diagram illustrating a DC-DC converter of an embodiment.

An embodiment will be described with reference to FIGS. 1 to 8. As illustrated in FIG. 1, a DC-DC converter 1 is a synchronous rectifying DC-DC buck converter that generates an output voltage Vo lower than an input voltage Vi supplied to an input terminal Ti, on the basis of the input voltage Vi. The output voltage Vo is supplied to a load 2 coupled to an output terminal To. An example of the load 2 is an internal circuit of a mobile electronic apparatus (a personal computer, a mobile phone, a game apparatus, a digital camera, etc.), a rechargeable battery, such as lithium battery, included in a notebook personal computer and the like.

The DC-DC converter 1 includes a converter 10 that generates the output voltage Vo on the basis of the input voltage Vi, and a control circuit 20 that controls the converter 10 on the basis of the output voltage Vo.

The converter 10 includes transistors T1 and T2, a coil L1 and a capacitor C1. The transistor T1 and the coil L1 on a main side are coupled to each other in series between the input terminal Ti to which the input voltage Vi is supplied and the output terminal To that outputs the output voltage Vo. The transistor T1 on the main side and the transistor T2 on a synchronous side are coupled to each other in series between the input terminal Ti and a power supply line (here, the ground) having a lower potential than the input voltage Vi.

The transistors T1 and T2 are n-channel MOS transistors. A first terminal (e.g., a drain) of the transistor T1 is coupled to the input terminal Ti. A second terminal (e.g., a source) of the transistor T1 is coupled to a first terminal (e.g., a drain) of the transistor T2. A second terminal (e.g., a source) of the transistor T2 is coupled to the ground. A gate of the transistor T1 is supplied with a control signal DH from a controller 30 of the control circuit 20. A gate of the transistor T2 is supplied with a control signal DL from the control circuit 20. In response to the control signal DH, the transistor T1 is turned on or off. In response to the control signal DL, the transistor T2 is turned on or off.

A node N1 between the transistors T1 and T2 is coupled to a first terminal of the coil L1. A second terminal of the coil L1 is coupled to the output terminal To. The output terminal To is coupled to the control circuit 20. The second terminal of the coil L1 is coupled to a first terminal of a smoothing capacitor C1. A second terminal of the capacitor C1 is coupled to the ground. The capacitor C1 is included in a smoothing circuit that smooths the output voltage Vo.

In such a converter 10, when the transistor T1 on the main side is turned on and the transistor T2 on the synchronous side is turned off, a coil current IL according to the difference between the input voltage Vi and the output voltage Vo flows through the coil L1 to charge energy in the coil L1. In contrast, when the transistor T1 on the main side is turned off and the transistor T2 on the synchronous side is turned on, the energy accumulated in the coil L1 is discharged to the load 2 and induced current flows through the coil L1. Such an operation generates the output voltage Vo reduced lower than the input voltage Vi. The output voltage Vo is output to the load 2 coupled to the output terminal To. The load 2 is supplied with a load current Io.

During an normal operation in a time period where an external control signal CTL at a logic H level (H level) is input into a control terminal Tc of the DC-DC converter 1, the control circuit 20 complementarily performs on-off control on the transistors T1 and T2 on the basis of the output voltage Vo such that the output voltage Vo approaches a target voltage. In other words, the control circuit 20 in the normal operation adjusts the on time of the transistor T1 on the basis of the output voltage Vo such that the load 2 is supplied with a desired power. For instance, the control circuit 20 supplies the transistors T1 and T2 with the respective control signals DH and DL that have a constant frequency (period) and a pulse width varying according to a power supplied to the load 2. Meanwhile, in a discharge operation during a time period where the external control signal CTL at a logic L level (L level) is input into the control terminal Tc, the control circuit 20 performs on-off control on the transistors T1 and T2 according to a switching operation in response to the magnitude of the load 2.

The control circuit 20 includes a feedback voltage generation circuit 21 that generates a feedback voltage VFB according to the output voltage Vo, and the controller 30 that performs on-off control on the transistors T1 and T2 on the basis of the feedback voltage VFB. The control circuit 20 includes: a load current detection circuit 40 configured to detect the load current Io flowing in the load 2; a setting circuit 45 configured to set the switching operation of the transistors T1 and T2 according to the magnitude of the load 2; and a voltage generation circuit 60 configured to generate a bias voltage VB from a high-potential power supply voltage VCC illustrated in FIG. 2, and to generate a reference voltage Vr according to the magnitude of the load 2. The external control signal CTL at the L level is a signal for instructing the DC-DC converter 1 to stop the operation.

The feedback voltage generation circuit 21 includes resistors R1 and R2. More specifically, the output terminal To is coupled to a first terminal of the resistor R1. A second terminal of the resistor R1 is coupled to a first terminal of the resistor R2. A second terminal of the resistor R2 is coupled to the ground. A node N2 between the resistors R1 and R2 is coupled to the controller 30 and the voltage generation circuit 60. Here, the resistors R1 and R2 generate, at the node N2, the feedback voltage VFB divided from the output voltage Vo according to the respective resistance values. The value of the feedback voltage VFB corresponds to the ratio of the resistance values of the resistors R1 and R2 and the potential difference between the output voltage Vo and the ground. Accordingly, the resistors R1 and R2 generate the feedback voltage VFB in proportion to the output voltage Vo. The feedback voltage VFB is supplied to the controller 30 and the voltage generation circuit 60.

The controller 30 includes an error amplifier circuit 31, a PWM comparator 32, an oscillator 33, AND circuits 34 and 35, and driver circuits 36 and 37.

An inverting input terminal of the error amplifier circuit 31 is supplied with the feedback voltage VFB. A non-inverting input terminal of the error amplifier circuit 31 is supplied with the reference voltage Vr from the voltage generation circuit 60.

The error amplifier circuit 31 compares the feedback voltage VFB with the reference voltage Vr, and outputs an error signal S1, which is an amplified difference voltage of the both voltages, to the PWM comparator 32. The PWM comparator 32 is supplied with a period signal CK having a prescribed period from the oscillator 33. The period signal CK is, for instance, a sawtooth wave signal (a signal having a sawtooth waveform that increases from a reference value according to a prescribed rising characteristics, and rapidly decreases to the reference value by resetting) or a triangular wave signal. The period signal CK is supplied also to the setting circuit 45.

The PWM comparator 32 compares the error signal S1 with the period signal CK. For instance, if the period signal CK has a signal level higher than the error signal S1 has, the PWM comparator 32 generates a PWM signal S2 at an L level (e.g., the ground level); if the period signal CK has a signal level lower than the error signal S1 has, this comparator generates the PWM signal S2 at an H level (e.g., the high-potential power supply voltage VCC level or the bias voltage VB level). The PWM signal S2 is supplied to the AND circuits 34 and 35.

The AND circuit 34 is supplied with the PWM signal S2, an output signal S5 output from the setting circuit 45, and a control signal SG1 output from the voltage generation circuit 60. The AND circuit 34 outputs, to a driver circuit 36, an output signal SH that is a result of logical manipulation operation on the PWM signal S2, the output signal S5 and the control signal SG1.

The AND circuit 35 is supplied with the PWM signal S2, an output signal S6 output from the setting circuit 45, and the control signal SG1 output from the voltage generation circuit 60. The AND circuit 35 outputs, to a driver circuit 37, an output signal SL that is a result of logical manipulation operation on the PWM signal S2, the output signal S5 and the control signal SG1.

The output terminal of the driver circuit 36 is coupled to the gate of the transistor T1 on the main side. A high potential side power supply terminal of the driver circuit 36 is coupled to a cathode of a diode D1, and a first terminal of a capacitor C2. A low voltage side power supply terminal of the driver circuit 36 is coupled to a second terminal of the capacitor C2 and the node N1. An anode of the diode D1 is coupled to a power supply line through which the bias voltage VB generated by the voltage generation circuit 60 is supplied. A second terminal of the capacitor C2 is coupled to the node N1. A charge voltage of the capacitor C2 is supplied to the high potential side power supply terminal of the driver circuit 36.

The function of the capacitor C2 is herein described. In order to turn on the n-channel MOS transistor T1, a voltage higher than that of the source is applied to the gate of the transistor T1. When the transistor T1 is turned on, both the source and the drain of the transistor T1 become the input voltage Vi. Accordingly, in the case where the transistor T1 on the main side supplied with the input voltage Vi is an n-channel MOS transistor, a gate voltage higher than the input voltage Vi is generated.

The power supply line supplied with the bias voltage VB is coupled to the first terminal of the capacitor C2 via the diode D1; the first terminal (node N1) of the coil L1 is coupled to the second terminal of this capacitor. Here, the bias voltage VB is lower than the input voltage Vi, and a forward direction voltage drop of the diode D1 is 0.7 V. If the transistor T1 is turned off and potential of the node N1 becomes the ground level, the capacitor C2 is charged to a voltage of VB−0.7 V via the diode D1. Next, if the transistor T1 is turned on and the voltage of the first terminal (node N1) of the coil L1 increases to the input voltage Vi, the potential of the second terminal of the capacitor C2 becomes the input voltage Vi. Accordingly, the potential of the first terminal of the capacitor C2 increases to the Vi+VB−0.7 V. Thus, the driver circuit 36 whose the high potential side power supply terminal is supplied with a voltage from the first terminal of the capacitor C2, may be always supplied with a voltage higher than the source voltage of the transistor T1 by VB−0.7 V, even when the transistor T2 is in an on state and also when the transistor T1 is in an on state. Accordingly, the driver circuit 36 may stably perform gate driving. Thus, the capacitor C2 functions as a bootstrap circuit. The diode D1 has a function of preventing current from flowing into the power supply line, which is supplied with the bias voltage VB from the capacitor C2 side, when the potential of the first terminal side of the capacitor C2 increases to Vi+VB−0.7 V.

The driver circuit 36 outputs the control signal DH at the H level (the charge voltage level of the capacitor C2) to the transistor T1 on the main side in response to the output signal SH at the H level (e.g., the high-potential power supply voltage VCC level or the bias voltage VB level). The driver circuit 36 outputs the control signal DH at the L level (the voltage level of the node N1) to the transistor T1 in response to the output signal SH at the L level (e.g., the ground level). The transistor T1 is turned on in response to the control signal DH at the H level, and turned off in response to the control signal DH at the L level.

An output terminal of the driver circuit 37 is coupled to the gate of the transistor T2 on the synchronous side. The bias voltage VB is supplied to a high potential side power supply terminal of the driver circuit 37. The low voltage side power supply terminal of the driver circuit 37 is coupled to the ground. The driver circuit 37 outputs the control signal DL at the L level (ground level) to the transistor T2 in response to the output signal SL at the H level (e.g., the high-potential power supply voltage VCC level or the bias voltage VB level). The driver circuit 37 outputs the control signal DL at the H level (the bias voltage VB level) to the transistor T2 in response to the output signal SL at the L level (e.g., the ground level). The transistor T2 is turned on in response to the control signal DL at the H level, and turned off in response to the control signal DL at the L level.

The controller 30 thus generates the control signals DH and DL for performing complementary on-off control on the transistors T1 and T2 such that the feedback voltage VFB according to the output voltage Vo approaches the reference voltage Vr, in the normal operation. Accordingly, the output voltage V0 is controlled to approach the target voltage based on the reference voltage Vr and the resistance values of the resistors R1 and R2.

The load current detection circuit 40 includes a sense resistor Rs, an operational amplifier 41, comparators 42 and 43, and reference power supplies E1 and E2.

The sense resistor Rs is inserted between and coupled to the output terminal To and the load 2. That is, a first terminal of the sense resistor Rs is coupled to the output terminal To, and a second terminal of the sense resistor Rs is coupled to the load 2.

The first terminal of the sense resistor Rs is coupled to an inverting input terminal of the operational amplifier 41. The second terminal of the sense resistor Rs is coupled to a non-inverting input terminal of the operational amplifier 41. The operational amplifier 41 amplifies the potential difference between both terminals of the sense resistor Rs to generate an amplified voltage Vamp. That is, the operational amplifier 41 generates the amplified voltage Vamp according to the magnitude of the load current Io (i.e., the magnitude of the load 2) flowing into the load 2. The amplified voltage Vamp is supplied to a non-inverting input terminal of the comparator 42, an inverting input terminal of the comparator 43, and the counter circuit 50 in the setting circuit 45.

The inverting input terminal of the comparator 42 is supplied with a reference voltage Vref1 generated by a reference power supply E1. The comparator 42 compares the amplified voltage Vamp of the operational amplifier 41 with the reference voltage Vref1 to generate an output signal S3 at a level according to the comparison result. For instance, if the amplified voltage Vamp is lower than the reference voltage Vref1, the comparator 42 generates an output signal S3 at an L level (e.g., the ground level). If the amplified voltage Vamp is higher than the reference voltage Vref1, the comparator 42 generates an output signal S3 at an H level (e.g., the bias voltage VB level). The output signal S3 is supplied to an OR circuit 46 and a voltage generation circuit 60.

The non-inverting input terminal of the comparator 43 is supplied with a reference voltage Vref2 generated by the reference power supply E2. The reference voltage Vref2 is set lower than the reference voltage Vref1. The comparator 43 compares the amplified voltage Vamp of the operational amplifier 41 with the reference voltage Vref2 to generate an output signal S4 at a level according to the comparison result. For instance, if the amplified voltage Vamp is lower than the reference voltage Vref2, the comparator 43 generates an output signal S4 at an H level (e.g., the bias voltage VB level). If the amplified voltage Vamp is higher than the reference voltage Vref2, the comparator 43 generates an output signal S4 at an L level (e.g., the ground level). The output signal S4 is supplied to an OR circuit 47 in the setting circuit 45 and an AND circuit 48.

Thus, the operational amplifier 41 and the comparators 42 and 43 detect the potential difference between both terminals of the sense resistor Rs to thereby detect the load current Io, and compare the amplified voltage Vamp with the reference voltages Vref1 and Vref2 to thereby determine the magnitude of the load current Io (i.e., the magnitude of the load 2).

Figures 2, 3:
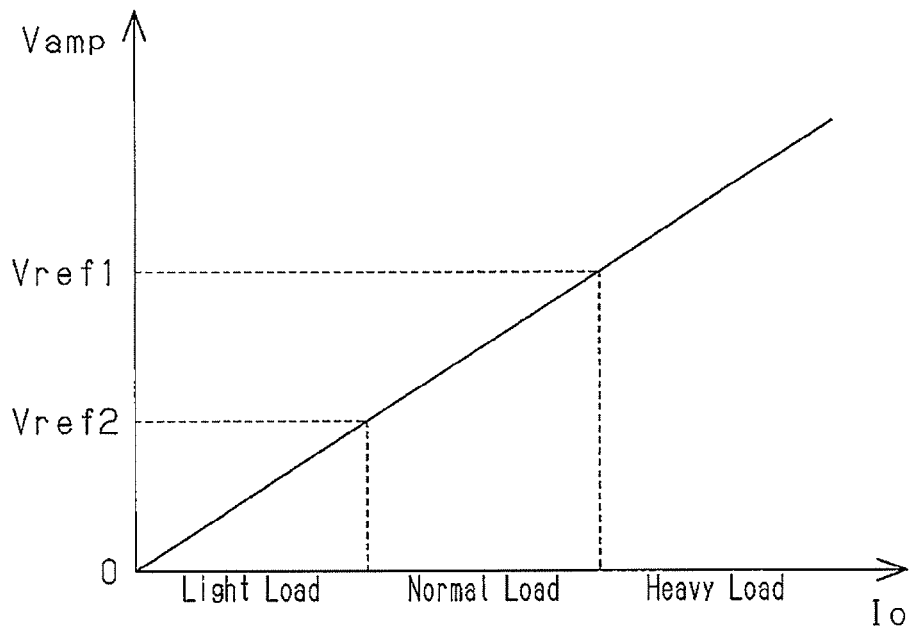
FIG. 2 illustrates the relationship between a load current and an amplified voltage.
FIG. 3 illustrates the relationship between the magnitude of a load and discharge control.

More specifically, as illustrated in FIG. 2, the higher the load current Io becomes (i.e., the heavier the load 2 becomes), the higher the amplified voltage Vamp becomes. Accordingly, the magnitude of the load 2 may be determined on the basis of the voltage value of the amplified voltage Vamp. That is, if the amplified voltage Vamp is low (in this example, if the amplified voltage Vamp is lower than the reference voltage Vref2), it may be determined that the load current Io is low and the load 2 is a "light load". If the load 2 is thus the "light load", the output signal S3 of the comparator 42 is at the L level, and the output signal S4 of the comparator 43 is at the H level, as illustrated in FIG. 3. In contrast, if the amplified voltage Vamp is high (in this example, if the amplified voltage Vamp is higher than the reference voltage Vref1), it may be determined that the load current Io is high and the load 2 is a "heavy load". If the load 2 is thus the "heavy load", the output signal S3 of the comparator 42 is at the H level and the output signal S4 of the comparator 43 is at the L level. If the amplified voltage Vamp is in a range (first range) higher than the reference voltage Vref2 and lower than the reference voltage Vref1, it may be determined that the load 2 is a "normal load" heavier than the "light load" but lighter than the "heavy load". If the load 2 is thus the "normal load", the output signal S3 of the comparator 42 is at the L level and the output signal S4 of the comparator 43 is at the L level.

In other words, the reference voltage Vref1 and the reference voltage Vref2 are for setting the magnitude of the load 2 to any of three steps, or the "light load", the "normal load" and the "heavy load". That is, the reference voltage Vref1 is for setting the lower limit of the amplified voltage Vamp in the case of determining that the load 2 is the "heavy load", and for setting the upper limit of the amplified voltage Vamp in the case of determining that the load 2 is the "normal load". The reference voltage Vref2 is for setting the upper limit of the amplified voltage Vamp in the case of determining that the load 2 is the "light load", and for setting the lower limit of the amplified voltage Vamp in the case of determining that the load 2 is the "normal load". The "light load" also covers the case where the load 2 is no load.

If it is defined that, as to the current value representing the load current Io, the upper limit of the "normal load" is represented as a first reference value and the lower limit is represented as a second reference value, the reference voltage Vref1 has a voltage value converted from the current value of the first reference value, and the reference voltage Vref2 has a voltage value converted from the current value of the second reference value.

As illustrated in FIG. 1, the setting circuit 45 includes the OR circuits 46 and 47, the AND circuit 48, and the counter circuit 50.

The OR circuit 46 is supplied with the output signal S3 of the comparator 42, an output signal S7 of the AND circuit 48, and the external control signal CTL. The OR circuit 46 outputs, to the AND circuit 34, the output signal S5 that is a result of logical addition operation on the output signal S3, the output signal S7 and the external control signal CTL.

The OR circuit 47 is supplied with the output signal S4 of the comparator 43 and the external control signal CTL. The OR circuit 47 outputs, to the AND circuit 35, the output signal S6 that is a result of logical addition operation on the output signal S4 and the external control signal CTL.

The counter circuit 50 is supplied with the amplified voltage Vamp of the operational amplifier 41 and the period signal CK generated by the oscillator 33. The counter circuit 50 frequency-divides the period signal CK at a division ratio according to the amplified voltage Vamp, to generate a count signal CNT. For instance, the lower the amplified voltage Vamp is, the higher the division ratio at which the counter circuit 50 frequency-divides the signal CK to generate the count signal CNT is. The count signal CNT is supplied to the AND circuit 48.

The AND circuit 48 is supplied with the output signal S4 of the comparator 43 and the count signal CNT output from the counter circuit 50. The AND circuit 48 outputs, to the OR circuit 46, the output signal S7 that is a result of logical manipulation operation of the output signal S4 and the count signal CNT. That is, the AND circuit 48 outputs the output signal S7 that has a signal level equivalent to that of the count signal CNT if the output signal S4 is at the H level (i.e., if the load 2 is the "light load"). The AND circuit 48 outputs the L-level-fixed output signal S7 irrespective of the signal level of the count signal CNT if the output signal S4 is at the L level (i.e., if the load 2 is the "normal load" or the "heavy load"). That is, the AND circuit 48 in the case where the load 2 is the "normal load" or the "heavy load" functions as a circuit for invalidating the count signal CNT.

Next, an example of an internal configuration of the counter circuit 50 is described.

Figure 4:
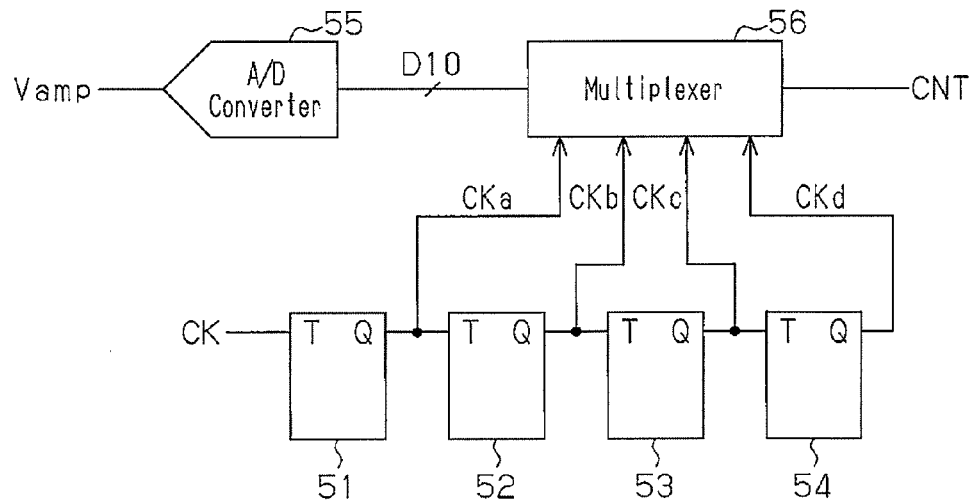
FIG. 4 is a block circuit diagram of an example a counter circuit.

As illustrated in FIG. 4, the counter circuit 50 includes multiple (here, four) T-flip-flop circuits (T-FF circuits) 51, 52, 53 and 54 coupled in series, an analog-to-digital converter (A/D converter) 55, and a multiplexer 56.

A T terminal of the T-FF circuit 51 is supplied with the period signal CK. The T-FF circuit 51 outputs, from an output terminal Q, a frequency-divided signal CKa acquired by frequency-halving the period signal CK. For instance, the T-FF circuit 51 inverts the signal level of the frequency-divided signal CKa each time when the period signal CK rises. The frequency-divided signal CKa is supplied to the T terminal of the T-FF circuit 52 on the next stage and the multiplexer 56.

The T-FF circuit 52 on the second stage outputs a frequency-divided signal CKb acquired by frequency-halving the frequency-divided signal CKa to a T terminal of the T-FF circuit 53 on the next stage and the multiplexer 56. The frequency-divided signal CKb is thus a signal acquired by frequency-quartering the period signal CK.

The T-FF circuit 53 on the third stage outputs a frequency-divided signal CKc acquired by frequency-halving the frequency-divided signal CKb to a T terminal of the T-FF circuit 54 on the next stage and the multiplexer 56. The frequency-divided signal CKc is thus a signal acquired by frequency-dividing the period signal CK into eight parts.

The T-FF circuit 54 on the fourth stage (last stage) outputs a frequency-divided signal CKd acquired by frequency-halving the frequency-divided signal CKc to the multiplexer 56. The frequency-divided signal CKd is thus a signal acquired by frequency-dividing the period signal CK into sixteen parts.

The A/D converter 55 is supplied with the amplified voltage Vamp. The A/D converter 55 converts the amplified voltage Vamp, which is an analog signal, into a multiple-bit (here, four-bit) digital signal D10, and outputs the digital signal D10 to the multiplexer 56.

The multiplexer 56 is supplied from the four T-FF circuits 51 to 54 with the four respective frequency-divided signals CKa, CKb, CKc and CKd acquired by frequency-dividing the period signal CK at the different division ratios. That is, the multiplexer 56 is supplied with the frequency-divided signal CKa at the division ratio of "2", the frequency-divided signal CKb at the division ratio of "4", the frequency-divided signal CKc at the division ratio of "8", and the frequency-divided signal CKd at the division ratio of "16". The multiplexer 56 selects one frequency-divided signal from among the four frequency-divided signals CKa to CKd according to the four-bit digital signal D10, and outputs the selected frequency-divided signal as the count signal CNT. For instance, as the digital signal D10 (amplified voltage Vamp) is lower (i.e., the load 2 is light), the multiplexer 56 outputs the frequency-divided signal at the higher division ratio among the four frequency-divided signals CKa to CKd as the count signal CNT.

Next, an example of an internal configuration of the voltage generation circuit 60 is described.

Figure 5:
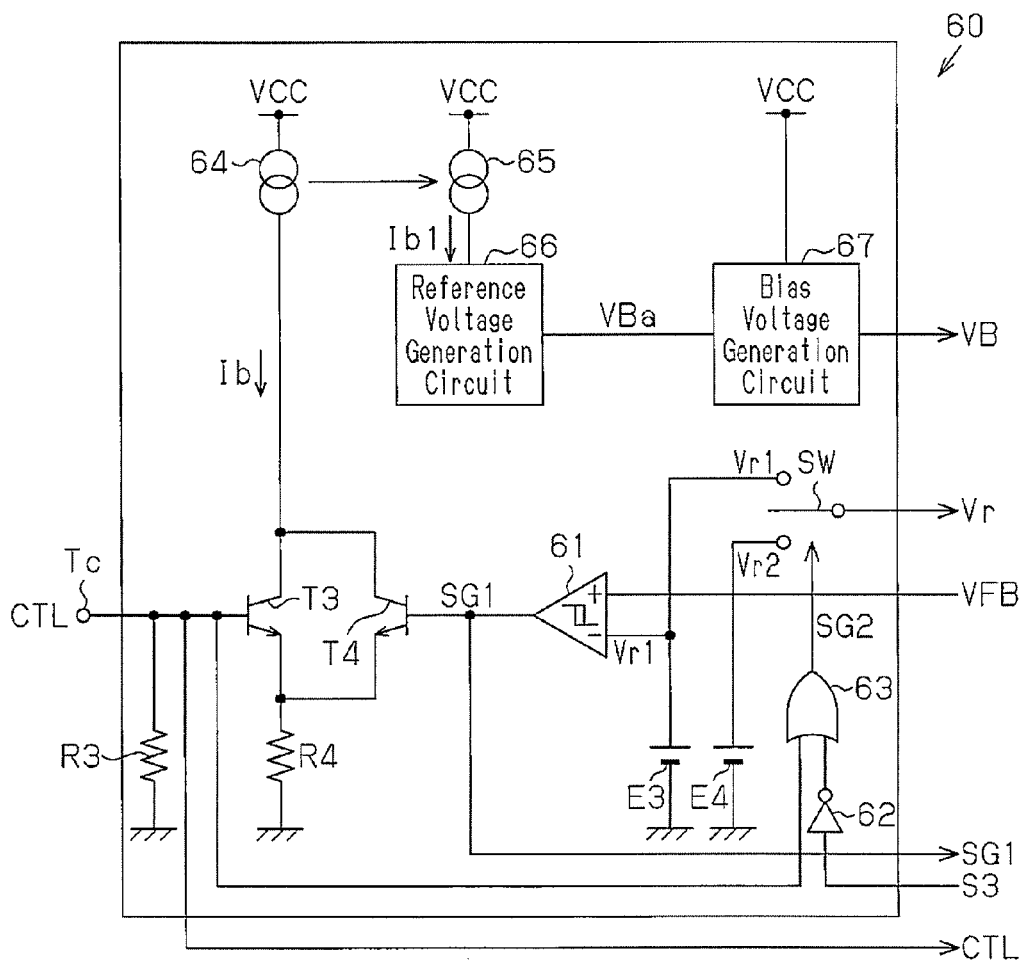
FIG. 5 is a block circuit diagram of an example of a voltage generation circuit.

As illustrated in FIG. 5, the voltage generation circuit 60 includes resistors R3 and R4, NPN transistors T3 and T4, a hysteresis comparator 61, reference power supplies E3 and E4, an inverter circuit 62, an OR circuit 63, a switch SW, current sources 64 and 65, a reference voltage generation circuit 66, and a bias voltage generation circuit 67.

The control terminal Tc with which the external control signal CTL is supplied is coupled to a first terminal of the resistor R3, a base terminal of the NPN transistor T3, the OR circuit 63, and the input terminals of the OR circuits 46 and 47 illustrated in FIG. 1. A second terminal of the resistor R3 is coupled to the ground.

An emitter terminal of the transistor T3 is coupled to a first terminal of the resistor R4. A second terminal of the resistor R4 is coupled to the ground. A collector terminal of the transistor T3 is coupled to a first terminal of the current source 64. The transistor T3 is turned on in response to the external control signal CTL at the H level, and turned off in response to the external control signal CTL at the L level.

A non-inverting input terminal of the hysteresis comparator 61 is supplied with the feedback voltage VFB. An inverting input terminal of the hysteresis comparator 61 is supplied with a reference voltage Vr1 generated by the reference power supply E3. An output terminal of the hysteresis comparator 61 is coupled to a base terminal of the NPN transistor T4. An emitter terminal of the transistor T4 is coupled to the first terminal of the resistor R4 and the emitter terminal of the transistor T3. A collector terminal of the transistor T4 is coupled to the first terminal of the current source 64 and the collector terminal of the transistor T3. That is, the transistor T3 and the transistor T4 are coupled in parallel.

In the hysteresis comparator 61, a lower limit reference voltage V1 (see FIG. 6) based on the reference voltage Vr1, and an upper limit reference voltage higher than the lower limit reference voltage V1 are set. The lower limit reference voltage V1 is for setting the off timing of the transistor T4.

The hysteresis comparator 61 compares the feedback voltage VFB with the lower limit reference voltage V1 and the upper limit reference voltage, and outputs the control signal SG1 according to the comparison result to the base terminal of the NPN transistor T4 and the AND circuits 34 and 35 illustrated in FIG. 1. For instance, if the feedback voltage VFB is lower than the lower limit reference voltage V1, the hysteresis comparator 61 outputs the control signal SG1 at the L level (e.g., the ground level). If the feedback voltage VFB is higher than the upper limit reference voltage, the hysteresis comparator 61 outputs the control signal SG1 at the H level (e.g., high-potential power supply voltage VCC level). The transistor T4 is turned on in response to the control signal SG1 at the H level, and turned off in response to the control signal SG1 at the L level.

A first terminal of the switch SW is coupled to a plus terminal of the reference power supply E3. A second terminal of the switch SW is coupled to a plus terminal of the reference power supply E4. Accordingly, the first terminal of the switch SW is supplied with the reference voltage Vr1. The second terminal of the switch SW is supplied with a reference voltage Vr2 generated by the reference power supply E4. A common terminal of the switch SW is coupled to a non-inverting input terminal of the error amplifier circuit 31 illustrated in FIG. 1. The switch SW switches connection between the common terminal and the first terminal or the second terminal in response to a control signal SG2 supplied by the OR circuit 63. For instance, the switch SW connects the common terminal to the first terminal and outputs the reference voltage Vr1 as the reference voltage Vr in response to the control signal SG2 at the L level (e.g., the ground level). The switch SW connects the common terminal to the second terminal and outputs the reference voltage Vr2 as the reference voltage Vr in response to the control signal SG2 at the H level (e.g., the high-potential power supply voltage VCC level). The reference voltage Vr2 matches the feedback voltage VFB when the output voltage Vo reaches the target voltage (specification value).

The inverter circuit 62 is supplied with the output signal S3 from the comparator 42 illustrated in FIG. 1. The inverter circuit 62 outputs a signal acquired by logically inverting the output signal S3 to the OR circuit 63. The OR circuit 63 outputs, to the switch SW, the control signal SG2 that is a result of logical addition operation of the output signal of the inverter circuit 62 and the external control signal CTL. More specifically, if the external control signal CTL is at the H level, the control signal SG2 at the H level is output from the OR circuit 63 irrespective of the signal level of the output signal S3, and the reference voltage Vr2 is output as the reference voltage Vr. Meanwhile, if the external control signal CTL is at the L level for instructing the DC-DC converter 1 to stop operation and the output signal S3 is at the H level, the control signal SG2 at the L level is output from the OR circuit 63 and the reference voltage Vr1 is output as the reference voltage Vr. That is, if the external control signal CTL is at the L level and the load 2 is the "heavy load", the reference voltage Vr1 is output as the reference voltage Vr.

Meanwhile, a second terminal of the current source 64 is coupled to the power supply line to which the high-potential power supply voltage VCC is supplied.

The current source 65 supplies the reference voltage generation circuit 66 with a current Ib1 according to a bias current Ib flowing to the transistor T3. For instance, the current source 65 supplies the reference voltage generation circuit 66 with the current Ib1 in proportion to the bias current Ib. A first terminal of the current source 65 is coupled to the reference voltage generation circuit 66. A second terminal of the current source 65 is supplied with the high-potential power supply voltage VCC. As the current source 65, for instance, a current mirror circuit may be used.

The reference voltage generation circuit 66 generates a reference voltage VBa on the basis of the current Ib1. For instance, the reference voltage VBa is generated according to a band-gap reference voltage. The reference voltage VBa is supplied to the bias voltage generation circuit 67.

The bias voltage generation circuit 67 generates the bias voltage VB having a prescribed voltage value on the basis of the reference voltage VBa. The bias voltage VB is supplied to the high potential side power supply terminal of the driver circuit 37, the diode D1 and the like illustrated in FIG. 1.

When the transistor T3 is turned on in response to the external control signal CTL at the H level, the bias current Ib defined by an emitter voltage of the transistor T3 and the resistor R4 flows in the voltage generation circuit 60. Also when the transistor T4 is turned on in response to the control signal SG1 at the H level, the bias current Ib defined by the emitter voltage of the transistor T4 and the resistor R4 flows. When the bias current Ib thus flows, the current Ib1 in proportion to the bias current Ib is supplied from the current source 65 to the reference voltage generation circuit 66. Accordingly, the reference voltage generation circuit 66 generates the reference voltage VBa, and the bias voltage generation circuit 67 generates the bias voltage VB.

In contrast, when the external control signal CTL at the L level is input into the voltage generation circuit 60, the transistor T3 is turned off. When the control signal SG1 at the L level is output from the hysteresis comparator 61, the transistor T4 is turned off. When both the transistors T3 and T4 are turned off, the bias current Ib does not flow. Thus, the current Ib1 is not supplied from the current source 65 to the reference voltage generation circuit 66. Accordingly, the reference voltage generation circuit 66 stops generating the reference voltage VBa. Thus, the bias voltage generation circuit 67 also stops generating the bias voltage VB.

In this embodiment, the DC-DC converter 1 is an example of a power supply and a power supply device. The transistor T1 is an example of a first switch circuit. The transistor T2 is an example of a second switch circuit. The coil L1 is an example of an induction element. The external control signal CTL at the logic L level is an example of a stop signal. The operational amplifier 41 is an example of an amplifier circuit. The comparator 42 is an example of a first comparator circuit. The comparator 43 is an example of a second comparator circuit. The reference voltage Vref1 is an example of a first reference voltage. The reference voltage Vref2 is an example of a second reference voltage. The output signal S3 is an example of an output signal of the first comparator circuit. The output signal S4 is an example of the output signal of the second comparator circuit. The error amplifier circuit 31, the PWM comparator 32 and the oscillator 33 are examples of a switching controller. The driver circuit 36 is an example of a first driver circuit. The driver circuit 37 is an example of a second driver circuit. The AND circuit 34 is an example of a first invalidation circuit. The AND circuit 35 is an example of a second invalidation circuit. The PWM signal S2 is an example of a pulse signal. The control signal DH is an example of a first control signal. The control signal DL is an example of a second control signal. The reference voltage Vr2 is an example of a third reference voltage. The reference voltage Vr1 is an example of a fifth reference voltage. The lower limit reference voltage V1 is an example of a fourth reference voltage.

Figure 6:
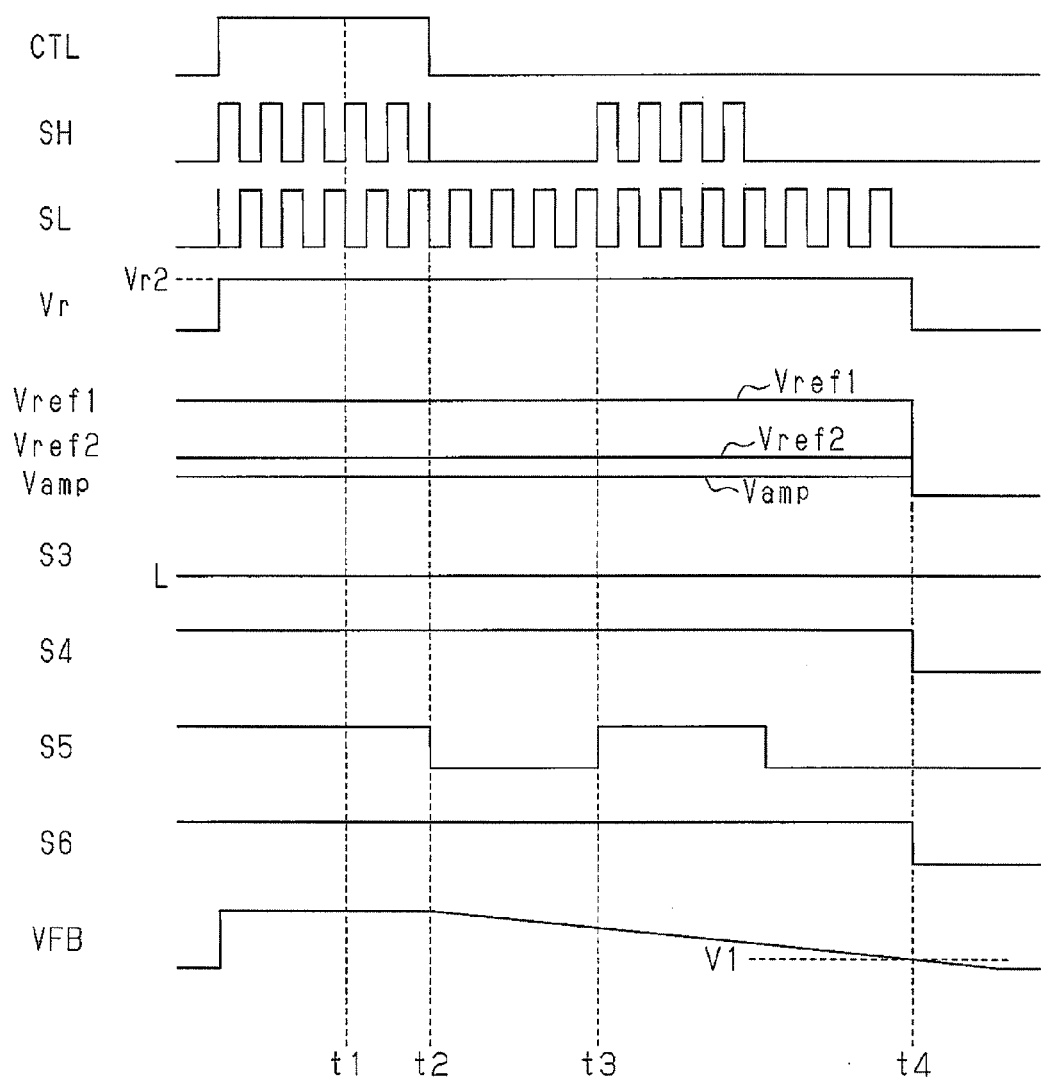
FIG. 6 is a waveform diagram for explaining an operation of a DC-DC converter of an embodiment.
Figure 7:
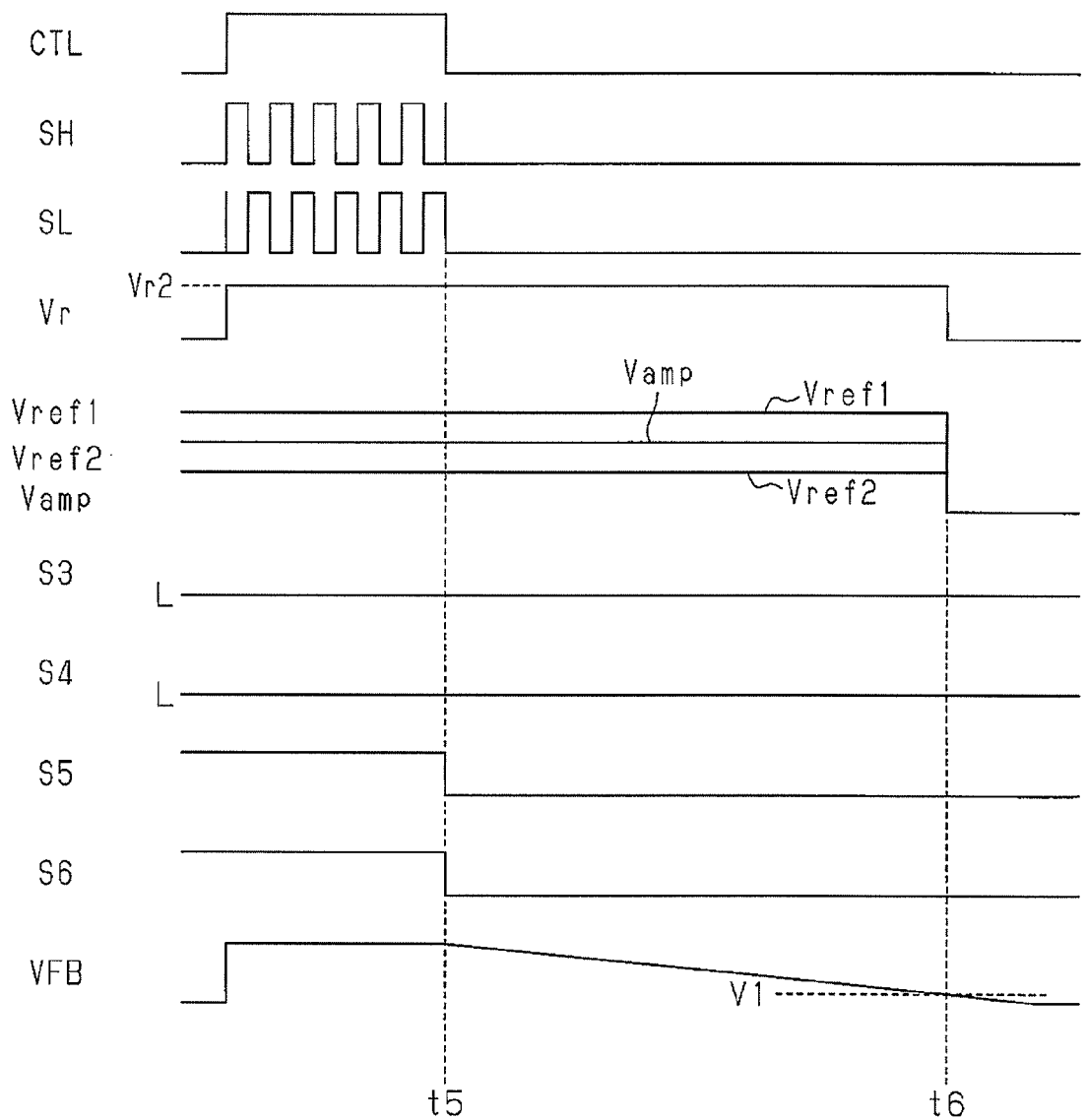
FIG. 7 is a waveform diagram for explaining an operation of the DC-DC converter of the embodiment.
Figure 8:
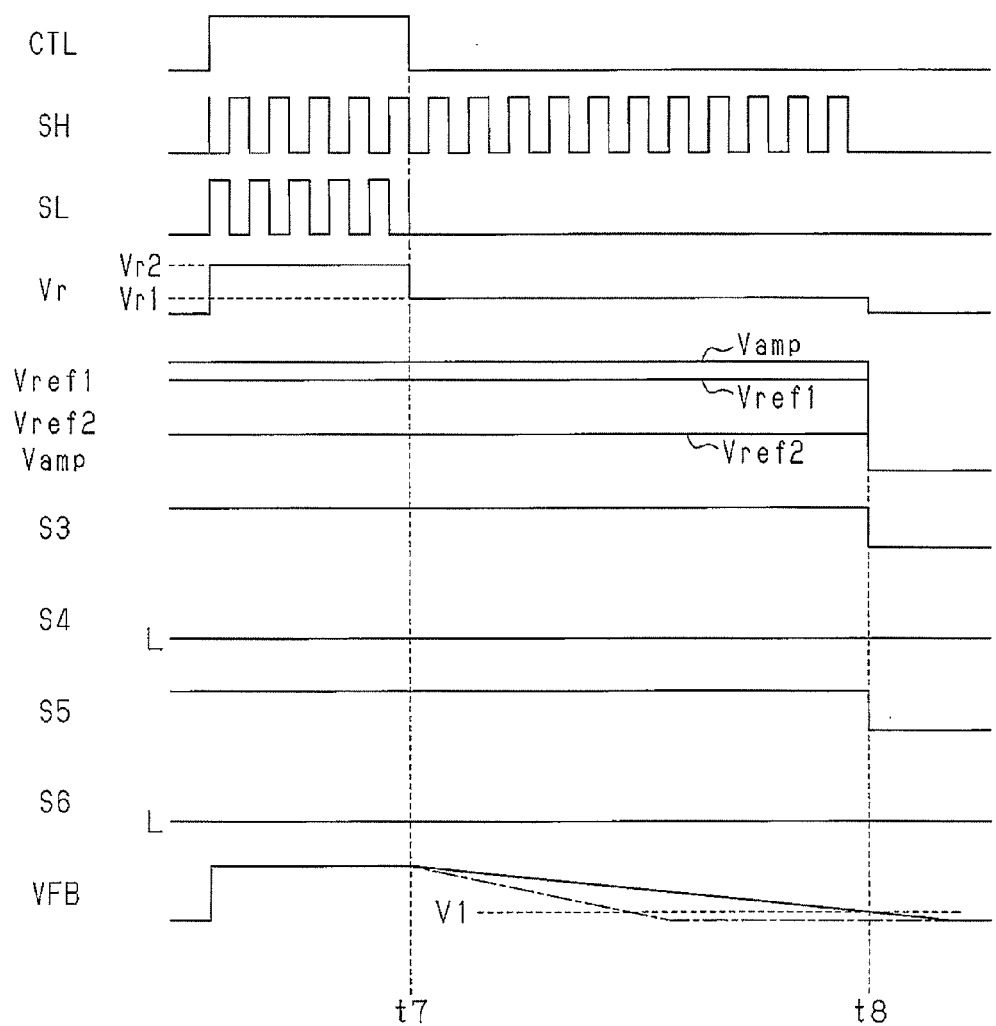
FIG. 8 is a waveform diagram for explaining an operation of the DC-DC converter of the embodiment.

Next, operations of the DC-DC converter 1 are described with reference to FIGS. 6 to 8. In FIGS. 6 to 8, the ordinate axis and the abscissa axis are appropriately enlarged and reduced for the sake of simplifying description.

First, an operation of the DC-DC converter 1 in the case where the load 2 is the "light load" is described.

At time t1 illustrated in FIG. 6, when the external control signal CTL at the H level is input into the DC-DC converter 1, the bias current Ib flows into the transistor T3 according to an on-operation of the transistor T3 illustrated in FIG. 5. Accordingly, the bias voltage generation circuit 67 generates the bias voltage VB. The bias voltage VB is supplied to the driver circuits 36 and 37. Thus, the control signals DH and DL at the H level or the L level output from the driver circuits 36 and 37 perform on-off control on the respective transistors T1 and T2. The OR circuit 63 outputs the control signal SG2 at the L level in response to the external control signal CTL at the H level. According to the control signal SG2, the reference voltage Vr2 is supplied as the reference voltage Vr to the error amplifier circuit 31. At time t1, the feedback voltage VFB is higher than the lower limit reference voltage V1. Accordingly, the control signal SG1 at the H level is supplied from the hysteresis comparator 61 to the base terminal of the transistor T4 and the AND circuits 34 and 35.

At this time, in the load current detection circuit 40 and the setting circuit 45 illustrated in FIG. 1, in response to the amplified voltage Vamp of the operational amplifier 41, the output signal S3 at the L level is output from the comparator 42 to the OR circuit 46, and the output signal S4 at the H level is output from the comparator 43 to the OR circuit 47. In this example, it is assumed that, on the basis of the amplified voltage Vamp representing that the load 2 is the "light load", the frequency-divided signal CKb acquired by frequency-quartering the period signal CK is output as the count signal CNT from the counter circuit 50. The count signal CNT is supplied to the AND circuit 48. The AND circuit 48 outputs the count signal CNT as the output signal S7 to the OR circuit 46 in response to the output signal S4 at the H level. Note that, since the external control signal CTL at the H level is input into the OR circuits 46 and 47, the H-level-fixed output signals S5 and S6 are supplied from the OR circuits 46 and 47 to the respective AND circuits 34 and 35. Accordingly, the AND circuit 34 outputs the PWM signal S2 from the PWM comparator 32, as the output signal SH, in response to the output signal S5 at the H level and the control signal SG1 at the H level. The AND circuit 35 outputs the PWM signal S2 as the output signal SL in response to the output signal S6 at the H level and the control signal SG1 at the H level.

As described above, when the external control signal CTL is at the H level, the reference voltage Vr2 set according to the target voltage of the output voltage Vo is supplied to the non-inverting input terminal of the error amplifier circuit 31. The PWM signal S2 is output from the AND circuits 34 and 35, as the respective output signals SH and SL. Accordingly, in this case, the converter 10, the feedback voltage generation circuit 21 and the controller 30 perform on-off control on the transistors T1 and T2 such that the output voltage Vo approaches the predetermined target voltage (the feedback voltage VFB approaches the reference voltage Vr2). Namely, a normal switching control is performed. That is, in a normal operation where the external control signal CTL is at the H level, the transistors T1 and T2 are subjected to on-off control on the basis of the comparison result between the output voltage Vo and the reference voltage Vr2. In other words, in the normal operation, the switching operation on the transistors T1 and T2 are not affected by the operations of the load current detection circuit 40 and the setting circuit 45.

In the normal switching control, the transistor T1 is turned on and the transistor T2 is turned off at a constant period based on the period signal CK. The on-operation on the transistor T1 increases the output voltage Vo. At this time, if the output voltage Vo is higher than the target voltage (i.e., the feedback voltage VFB is higher than the reference voltage Vr2), the error signal S1 decreases and, in turn, the on time of the transistor T1 decreases. In contrast, if the output voltage Vo is lower than the target voltage (i.e., the feedback voltage VFB is lower than the reference voltage Vr2), the error signal S1 increases and, in turn, the on time of the transistor T1 increases. Such an operation maintains the output voltage Vo at a target voltage (constant value) based on the reference voltage Vr2 and the resistors R1 and R2.

Subsequently, at time t2, the external control signal CTL at the L level for instructing the DC-DC converter 1 to stop operation is input into the DC-DC converter 1, and the transistor T3 illustrated in FIG. 5 is turned off. At this time, the feedback voltage VFB is higher than the lower limit reference voltage V1. Accordingly, the control signal SG1 at the H level is output from the hysteresis comparator 61, and, in response to the control signal SG1, the transistor T4 is turned on. The on-operation on the transistor T4 causes the bias current Ib to flow into the transistor T4. Accordingly, the bias voltage generation circuit 67 generates the bias voltage VB. That is, the on-operation on the transistor T4 continues generating the bias voltage VB even after the external control signal CTL transitions to the L level. The bias voltage VB is supplied to the driver circuits 36 and 37. Thus, the driver circuits 36 and 37 are maintained in states capable of outputting the control signals DH and DL at the H level and the L level. The control signal SG1 at the H level is supplied also to the AND circuits 34 and 35.

At this time, in the load current detection circuit 40 illustrated in FIG. 1, the amplified voltage Vamp, which is lower than the reference voltages Vref1 and Vref2, is output from the operational amplifier 41. Accordingly, as described above, the output signal S3 at the L level and the output signal S4 at the H level are output from the respective comparators 42 and 43. That is, in the load current detection circuit 40, the load current Io flowing to the load 2 is small at time t2, and the load 2 is determined as the "light load". In the setting circuit 45, the output signal S7 having a signal level equivalent to that of the count signal CNT (here, the frequency-divided signal acquired by frequency-quartering the period signal CK) is output from the AND circuit 48. In response to the external control signal CTL at the L level and the output signal S3 at the L level, the output signal S5 having a signal level equivalent to that of the count signal CNT is output from the OR circuit 46. In response to the external control signal CTL at the L level, the output signal S6 at the H level is output from the OR circuit 47.

When the output signal S5 is at the H level, the AND circuit 34 outputs the output signal SH having a signal level equivalent to the PWM signal S2 from the PWM comparator 32, in response to the control signal SG1 at the H level. In contrast, when the output signal S5 is at the L level, the AND circuit 34 outputs the L-level-fixed output signal SH irrespective of the signal level of the PWM signal S2. Here, in this example, immediately after time t2, the output signal S5 is at the L level only for four periods of the period signal CK. Accordingly, immediately after the output signal SH at the H level is output at time t2, the AND circuit 35 outputs the L-level-fixed output signal SH only for four periods of the period signal CK. Thus, in the time period during which the L-level-fixed output signal SH is output, the transistor T1 on the main side is supplied with the L-level-fixed control signal DH. Accordingly, the transistor T1 is maintained in the off state. That is, in the time period during which the count signal CNT is at the L level, the switching control on the transistor T1 is stopped.

Meanwhile, the AND circuit 35 outputs the output signal SL having a signal level equivalent to that of the PWM signal S2 in response to the output signal S6 at the H level and the control signal SG1 at the H level. Accordingly, even after the external control signal CTL transitions to the L level, the switching control on the transistor T2 on the synchronous side continues in response to the control signal DL that is switched to the H level and the L level. That is, even after the external control signal CTL transitions to the L level, the normal switching control continues on the transistor T2 on the synchronous side.

Thus, the transistor T1 is maintained in the off state and only the transistor T2 is subjected to switching control, thereby allowing the charge accumulated in the capacitor C1 to be discharged to the ground in the on time period of the transistor T2. Furthermore, the load 2 coupled to the output terminal To discharges the charge accumulated in the capacitor C1. Accordingly, the output voltage Vo and the feedback voltage VFB gradually decrease.

Subsequently, four periods of the period signal CK elapses after time t2 (see time t3), and the output signal S5 (count signal CNT) transitions from the L level to the H level. The PWM signal S2 is output as the output signal SH, and the normal switching control is restarted on the transistor T1. Accordingly, in the time period during which the count signal CNT is at the H level, the transistors T1 and T2 are subjected to complementary on-off control to control the output voltage Vo to approach the reference voltage Vr (reference voltage Vr2). Accordingly, in the time period during which the count signal CNT is at the H level, decreasing speeds of the output voltage Vo and the feedback voltage VFB are mitigated, in comparison with the time period during which the count signal CNT is at the L level. In this time period, the charge accumulated in the capacitor C1 is discharged by the load 2.

As described above, when the external control signal CTL becomes the L level, discharge control by the load current detection circuit 40 and the setting circuit 45 is started. At this time, in the case where the load 2 is the "light load", switching control on the transistor T1 is performed intermittently according to the period of the count signal CNT while switching control on the transistor T2 is continuously performed. That is, in the case where the load 2 is the "light load", the transistor T1 is caused to perform operation including the time period for on-off operation and the time period of being in the off state, and the transistor T2 is caused to perform on-off operation. In other words, in the case where the load 2 is the "light load", the number of switching controls (the number of on-off operations) on the transistor T1 is controlled to be smaller than the number of switching controls (the number of on-off operations) on the transistor T2. Switching of the transistor T2 in the time period during which the switching control of the transistor T1 is stopped allows the transistor T2 being turned on and the load 2 to gradually reduce the output voltage Vo. Thus, the switching control on the transistor T1 is not completely stopped. Instead, switching control on the transistor T1 is intermittently performed, thereby facilitating control of time in which the output voltage Vo decreases to a desired voltage value (e.g., the lower limit reference voltage V1) (i.e., discharge time).

When the feedback voltage VFB having gradually decreased becomes lower than the lower limit reference voltage V1 (see time t4), the control signal SG1 at the L level is output from the hysteresis comparator 61. In response to the control signal SG1 at the L level, the AND circuits 34 and 35 output the L-level-fixed output signals SH and SL irrespective of the signal levels of the PWM signal S2 and the output signals S5 and S6. That is, the control signal SG1 at the L level invalidates the PWM signal S2 and the output signals S5 and S6 output from the setting circuit 45. That is, discharge control by the load current detection circuit 40, the setting circuit 45 and the like is stopped.

In response to the control signal SG1 at the L level, the transistor T4 is turned off. Since both the transistors T3 and T4 are turned off, the bias current Ib does not flow. Accordingly, generation of the reference voltage VBa in the reference voltage generation circuit 66 and generation of the bias voltage VB in the bias voltage generation circuit 67 are stopped. In response to the stop of the generation of the bias voltage VB, the operations of the driver circuits 36 and 37 and the like are stopped, and the operations of the load current detection circuit 40 and the setting circuit 45 are stopped. That is, when the feedback voltage VFB becomes lower than the lower limit reference voltage V1, the entire operation of the DC-DC converter 1 is stopped. Subsequently, the charge accumulated in the capacitor C1 is discharged by the load 2, and the output voltage Vo and the feedback voltage VFB gradually decrease to 0 V.

Next, an operation of the DC-DC converter 1 in the case where the load 2 is the "normal load" is described.

At time t5 illustrated in FIG. 7, the external control signal CTL transitions from the H level to the L level. In response to the external control signal CTL at the L level, the transistor T3 illustrated in FIG. 5 is turned off. At this time, the feedback voltage VFB is higher than the lower limit reference voltage V1. Accordingly, the control signal SG1 at the H level is output from the hysteresis comparator 61. In response to the control signal SG1 at the H level, the transistor T4 is turned on. The on-operation of the transistor T4 causes the bias voltage generation circuit 67 to generate the bias voltage VB. The control signal SG1 at the H level is supplied also to the AND circuits 34 and 35.

At this time, in the load current detection circuit 40 illustrated in FIG. 1, the amplified voltage Vamp that is higher than the reference voltage Vref2 but lower than the reference voltage Vref1 is output from the operational amplifier 41. Accordingly, the output signal S3 at the L level and the output signal S4 at the L level are output from the respective comparators 42 and 43. That is, in the load current detection circuit 40, it is determined that the load 2 is the "normal load" at time t5.

In response to the output signal S4 at the L level, the AND circuit 48 outputs the L-level-fixed output signal S7 irrespective of the signal level of the count signal CNT. That is, if the load 2 is determined as the "normal load", the AND circuit 48 invalidates the count signal CNT. The OR circuit 46 outputs the output signal S5 at the L level to the AND circuit 34 in response to the output signals S3 and S7 at the L level and the external control signal CTL at the L level. Accordingly, the AND circuit 34 outputs the L-level-fixed output signal SH irrespective of the signal level of the PWM signal S2. The OR circuit 47 outputs the output signal S6 at the L level to the AND circuit 35 in response to the output signal S4 at the L level and the external control signal CTL at the L level. Accordingly, the AND circuit 35 outputs the L-level-fixed output signal SL irrespective of the signal level of the PWM signal S2. The L-level-fixed output signals SH and SL are thus output, which supplies the L-level-fixed control signals DH and DL to the respective transistors T1 and T2. Accordingly, the transistors T1 and T2 are maintained in the off state. That is, switching control on both the transistors T1 and T2 is stopped.

As described above, if the external control signal CTL becomes the L level in the case where the load 2 is the "normal load", the switching control on the transistors T1 and T2 is stopped. That is, in the case where the load 2 is the "normal load", both the transistors T1 and T2 are caused to be in the off state. In this case, the charge accumulated in the capacitor C1 is discharged by the load 2. Accordingly, the output voltage Vo and the feedback voltage VFB gradually decrease. Subsequently, when the feedback voltage VFB becomes lower than the lower limit reference voltage V1 (see time t6), the discharge control by the load current detection circuit 40, the setting circuit 45 and the like is stopped as described above, and the entire operation of the DC-DC converter 1 is stopped.

Next, an operation of the DC-DC converter 1 in the case where the load 2 is the "heavy load" is described.

At time t7 illustrated in FIG. 8, the external control signal CTL transitions from the H level to the L level. In response to the external control signal CTL at the L level, the transistor T3 illustrated in FIG. 5 is turned off. At this time, the feedback voltage VFB is higher than the lower limit reference voltage V1. Accordingly, in response to the control signal SG1 at the H level output from the hysteresis comparator 61, the transistor T4 is turned on. The on-operation on the transistor T4 causes the bias voltage generation circuit 67 to generate the bias voltage VB. The control signal SG1 at the H level is supplied also to the AND circuits 34 and 35.

At this time, in the load current detection circuit 40 illustrated in FIG. 1, the amplified voltage Vamp that is higher than the reference voltage Vref2 and higher than the reference voltage Vref1 is output from the operational amplifier 41. Accordingly, the output signal S3 at the H level and the output signal S4 at the L level are output from the respective comparators 42 and 43. That is, in the load current detection circuit 40, it is determined that the load 2 is the "heavy load" at time t7.

The OR circuit 46 outputs the H-level-fixed output signal S5 to the AND circuit 34 in response to the output signal S3 at the H level. Accordingly, the AND circuit 34 outputs the output signal SH having a signal level equivalent to that of the PWM signal S2 in response to the output signal S5 at the H level and the control signal SG1 at the H level. Accordingly, even after the external control signal CTL transitions to the L level, switching control on the transistor T1 on the main side continues in response to the control signal DH switching to the H level and the L level. Note that the output signal S3 at the H level is input into the inverter circuit 62 illustrated in FIG. 5, and the external control signal CTL at the L level is input into the OR circuit 63. Accordingly, the control signal SG2 at the L level is supplied to the switch SW. Accordingly, the reference voltage Vr1 lower than the reference voltage Vr2 is supplied as the reference voltage Vr to the error amplifier circuit 31 illustrated in FIG. 1. Accordingly, on the basis of the comparison result between the feedback voltage VFB and the reference voltage Vr (reference voltage Vr1), the PWM signal S2 is generated. In response to the control signal DH generated according to the PWM signal S2, the transistor T1 on the main side is subjected to switching control.

Meanwhile, in response to the output signal S4 at the L level and the external control signal CTL at the L level, the OR circuit 47 outputs the output signal S6 at the L level to the AND circuit 35. Accordingly, the AND circuit 35 outputs the L-level-fixed output signal SL irrespective of the signal level of the PWM signal S2. The L-level-fixed output signal SL is thus output, which supplies the transistor T2 with the L-level-fixed control signal DL. Accordingly, the transistor T2 is maintained in the off state. That is, switching control on the transistor T2 is stopped.

As described above, when the external control signal CTL becomes the L level in the case where the load 2 is the "heavy load", the switching control on the transistor T2 is stopped and the transistor T2 is maintained in the off state, and the switching control on the transistor T1 continues. That is, in the case where the load 2 is the "heavy load", on the basis of the output voltage Vo, the transistor T1 is subjected to the on-off operation and the transistor T2 is set to the off state.

The transistor T1 is subjected to the on-off control such that the feedback voltage VFB approaches the reference voltage Vr1. The transistor T1 is thus set to the on state in the discharge time period after the external control signal CTL becomes the L level, the charge accumulated in the capacitor C1 is prevented from being quickly discharged. More specifically, in the case where the load 2 is the "heavy load", if the capacitor C1 is discharged only by the load 2, the charge accumulated in the capacitor C1 is unfortunately discharged quickly. Accordingly, the output voltage Vo suddenly varies as described above. To address thereto, the time period during which the transistor T1 on the main side is turned on is provided in the discharge time period, which suppresses the discharge rate in the time period. Accordingly, quick discharging of the charge accumulated in the capacitor C1 may be suppressed and, in turn, sudden variation in the output voltage Vo may be suppressed (suddenly decreasing). That is, as with the case using the soft stop technique, the output voltage Vo may be gradually reduced (see the feedback voltage VFB illustrated in FIG. 8). In the case where the load 2 is further heavy, i.e., the case where the amplified voltage Vamp of the operational amplifier 41 is further higher, the decreasing speeds of the output voltage Vo and the feedback voltage VFB in the discharge time period further increase (see alternate long and short dashed lines). Even in this case, the time period where the transistor T1 is turned on is provided in the discharge time period, which may suppress sudden decrease of the output voltage Vo, and allow the output voltage Vo to gradually decrease.

Subsequently, when the feedback voltage VFB becomes lower than the lower limit reference voltage V1 (see time t8), the discharge control by the load current detection circuit 40, setting circuit 45 and the like is stopped as described above, and the entire operation of the DC-DC converter 1 is stopped.

The aforementioned embodiment may exert following advantageous effects.

(1) In the case where the load 2 is the "heavy load", when the external control signal CTL becomes the L level, the transistor T2 is maintained in the off state and the switching control on the transistor T1 continues. Furthermore, the transistor T1 is subjected to on-off control such that the feedback voltage VFB approaches the reference voltage Vr1. Accordingly, after the external control signal CTL transitions to the L level, quick discharging of the charge accumulated in the capacitor C1 may be suppressed and sudden variation (sudden decrease) in the output voltage Vo may be suppressed. That is, as with the case of using the soft stop technique, the output voltage Vo may be gradually reduced. Furthermore, in contrast to the case of the soft stop technique, no external large capacitor is required to be provided. No dedicated terminal for connecting the capacitor is required either. Accordingly, increase in the entire circuit area of the DC-DC converter 1 may be suppressed.

(2) In the case where the load 2 is the "light load", when the external control signal CTL becomes the L level, the switching control is intermittently performed on the transistor T1, and the switching control continues on the transistor T2. Accordingly, in the time period during which the switching control on the transistor T1 is stopped and the transistor T1 is maintained in the off state, the transistor T2 is turned on, which may allow the transistor T2 and the load 2 being turned on to gradually reduce the output voltage Vo. In the time period during which the switching control is performed on the transistor T1, the decreasing speed of the output voltage Vo is reduced in comparison with the time period during which the switching control of the transistor T1 is stopped as described above. Thus, the switching control on the transistor T1 is not completely stopped, but the switching control on the transistor T1 is intermittently performed instead, thereby facilitating control of the time (i.e., discharge time) during which the output voltage Vo decreases to a desired voltage value (e.g., the lower limit reference voltage V1).

(3) The frequency-divided signal acquired by frequency-dividing the period signal CK at the division ratio according to the magnitude of the load 2 is generated as the count signal CNT. In response to the count signal CNT, switching control is intermittently performed on the transistor T1. For instance, in this example, as the load 2 is lighter, the frequency-divided signal acquired by frequency-dividing the period signal CK at a higher division ratio is generated as the count signal CNT. Here, the lighter the load 2 is, the lower the discharge rate due to the load 2 is. Accordingly, the discharge time increases. The heavier the load 2 is, the higher the discharge rate due to the load 2 is. Accordingly, the discharge time decreases. Thus, in the case where the stop time period of the switching control on the transistor T1 is fixed, the lighter the load 2 is, the longer the discharge time is. Accordingly, the discharge time depends on the magnitude of the load 2. In contrast, in this example, the lighter the load 2 is, the higher the division ratio is set. Accordingly, the stop time period (i.e., the time period with a high discharge rate) of the switching control on the transistor T1 increases. Accordingly, the discharge time that does not depend on the magnitude of the load 2 may be easily set.

It should be apparent to those skilled in the art that the present invention may be embodied in many other specific forms without departing from the spirit or scope of the invention. Particularly, it should be understood that the present invention may be embodied in the following forms.

The load current detection circuit 40 in the above embodiment detects the potential difference between both terminals of the sense resistor Rs to detect the magnitude of the load current Io. The circuit is not limited thereto. Only if the magnitude of the load 2 may be detected, a detection method and a detection object are not limited.

In the above embodiment, in the time period after the external control signal CTL transitions to the L level, the magnitude of the load current Io is continuously detected. Without limitation thereto, for instance, the amplified voltage Vamp may be sample-held at the time when the external control signal CTL becomes the L level, and the discharge control may be performed on the basis of the sample-held amplified voltage Vamp. That is, the discharge control may be performed on the basis of the magnitude of the load 2 at the time when the external control signal CTL becomes the L level.

The internal configuration of the counter circuit 50 in the above embodiment is not specifically limited. For instance, one to three T-FF circuits may be provided. At least five T-FF circuits may be provided. In this case, it is preferable that the number of bits of the digital signal D10 be increased or reduced in conformity with the number of T-FF circuits. The period signal CK is frequency-divided at the division ratio according to the magnitude of the load 2. For instance, the period signal CK may be frequency-divided at a fixed division ratio. The period signal CK is thus frequency-divided at a prescribed division ratio. For instance, the PWM signal S2 may be frequency-divided at a prescribed division ratio instead.

In the above embodiment, the n-channel MOS transistor T1 is disclosed as an example of the first switch circuit. Alternatively, a p-channel MOS transistor may be used as the first switch circuit. A bipolar transistor may be used as the first switch circuit. Instead, a switch circuit including multiple transistors may be used as the first switch circuit.

In the above embodiment, the n-channel MOS transistor T2 is disclosed as an example of the second switch circuit. Alternatively, a p-channel MOS transistor may be used as the second switch circuit. A bipolar transistor may be used as the second switch circuit. Alternatively, a switch circuit including multiple transistors may be used as the second switch circuit.

In the above embodiment, the internal configuration of the controller 30 may not be specifically limited. For instance, in the above embodiment, the PWM controlling DC-DC converter 1 is specifically adopted. A PFM (pulse frequency modulation) controlling DC-DC converter or a PSM (pulse skipping modulation) controlling DC-DC converter may be specifically adopted. In the above embodiment, the voltage control mode DC-DC converter 1 is specifically adopted. Alternatively, a current control mode DC-DC converter may be specifically adopted. In the above embodiment, the DC-DC converter 1 including the error amplifier circuit 31 is specifically adopted. Alternatively, a hysteresis controlling DC-DC converter, such as of a comparator system using an error comparator, may be specifically adopted.

The transistors T1 and T2 in the above embodiment may be included in the control circuit 20. The converter 10 may be included in the control circuit 20.

In the above embodiment, the DC-DC buck converter that generates the output voltage Vo acquired by reducing the input voltage Vi is specifically adopted. Alternatively, a DC-DC boost converter that generates an output voltage Vo acquired by increasing the input voltage Vi may be specifically adopted.

In each of the above embodiments, a divided voltage acquired by dividing the output voltage Vo by the resistors R1 and R2 is adopted as the feedback voltage VFB. Without limitation thereto, for instance, the output voltage Vo itself may be adopted as the feedback voltage VFB.

The reference voltages Vref1, Vref2, Vr1 and Vr2 in the above embodiment may be generated out of the control circuit 20.

Figure 9:
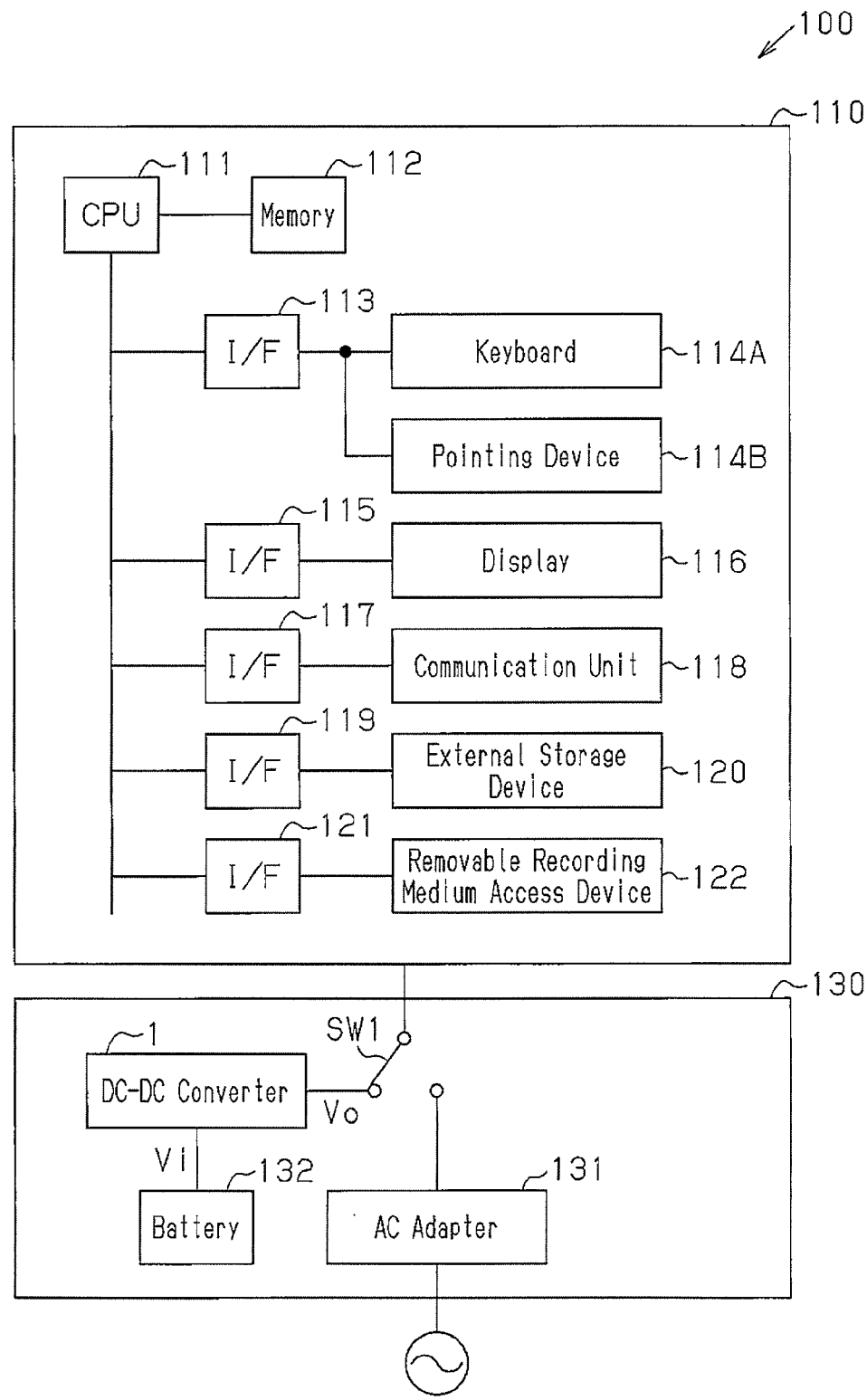
FIG. 9 is a schematic diagram illustrating an electronic apparatus.

Referring to FIG. 9, an example of an electronic apparatus 100 including the DC-DC converter 1 will be discussed.

The electronic apparatus 100 includes a main body 110 (internal circuit), and a power supply 130. The main body 110 includes a CPU 111 that executes a program, and a memory 112 that stores the program executed by the CPU 111 or data processed by the CPU 111. The main body 110 includes a keyboard 114A and a pointing device 114B that are coupled to the CPU 111 via an interface (I/F) 113. The pointing device 114B is, for instance, a flat devices or the like, such as a mouse, a trackball, a touch panel or an electrostatic sensor.

The main body 110 includes a display 116 coupled to the CPU 111 via an interface 115. The display 116 is, for instance, a liquid crystal display (LCD), an EL (electroluminescence) panel or the like.

The main body 110 further includes a communication unit 118 coupled to the CPU 111 via an interface 117. The communication unit 118 is, for instance, an LAN (local area network) board or the like.

The main body 110 includes an external storage device 120 coupled to the CPU 111 via an interface 119. The external storage device 120 is, for instance, a hard disk.

The main body 110 further includes a removable recording medium access device 122 coupled to the CPU 111 via an interface 121. Here, the removable recording medium may be, for instance, a CD (compact disc), a DVD (digital versatile disk), a flash memory card or the like.

The main body 110 is supplied with power from the power supply 130. The power supply 130 is coupled to the DC-DC converter 1 and an AC adapter 131 via a switch SW1. The main body 110 is supplied with power from any one of the DC-DC converter 1 and the AC adapter 131. In the example in FIG. 9, the DC-DC converter 1 converts, for instance, a voltage (input voltage Vi) from a battery 132 into the output voltage Vo, and supplies the output voltage Vo to the main body 110.

Such an electronic apparatus may be a notebook personal computer, a communication apparatus, such as a mobile phone, an information processing apparatus, such as a personal digital assistant (PDA), an imaging apparatus, such as a digital camera or a video camera, a receiver, such as a television apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although embodiments of the present invention have been described in detail, it should be understood that various changes, substitutions, and alterations could be made hereto without departing from the spirit and scope of the invention.

What is claimed is:

1. A control circuit of a power supply configured to produce an output voltage from an input voltage by performing on-off control on a first switch circuit that is turned on to accumulate energy in an induction element and on a second switch circuit that is turned on to discharge the energy accumulated in the induction element to a load coupled to an output terminal, the control circuit comprising:
    a detection circuit configured to detect a load current flowing into the load; and
    a setting circuit configured to set switching operations on the first switch circuit and the second switch circuit according to the load current, wherein the setting circuit is configured to:
    cause both the first switch circuit and the second switch circuit to be in an off state over a period of time from when a power supply stop signal is input from an outside device to when the output voltage gradually decreases to a certain voltage value, if the load current is in a first range, and
    cause the first switch circuit to perform an on-off operation based on the output voltage while causing the second switch circuit to be in the off state over the period of time from when the power supply stop signal is input to when the output voltage gradually decreases to the certain voltage value, if the load current is higher than a first reference value that is an upper limit of the first range when the power supply stop signal is input.

2. The control circuit according to claim 1, wherein if the load current at a time when the power supply stop signal is input is lower than a second reference value that is a lower limit of the first range, the setting circuit is configured to intermittently perform on-off control on the first switch circuit and cause the second switch circuit to perform an on-off operation based on the output voltage.

3. The control circuit according to claim 2, wherein the detection circuit includes an amplifier circuit configured to generate an amplified voltage acquired by amplifying a potential difference between both terminals of a sense resistor inserted between and coupled to the output terminal and the load.

4. The control circuit according to claim 3, wherein the detection circuit further includes:
   a first comparator circuit configured to compare a first reference voltage for setting the upper limit of the first range with the amplified voltage, and
   a second comparator circuit configured to compare a second reference voltage for setting the lower limit of the first range with the amplified voltage,
   wherein the setting circuit is further configured to set the switching operations on the first switch circuit and the second switch circuit according to an output signal of the first comparator circuit and an output signal of the second comparator circuit.

5. The control circuit according to claim 2, wherein the setting circuit includes a counter circuit configured to generate a count signal acquired by frequency-dividing a period signal having a frequency identical to a switching frequency of the first switch circuit at a division ratio according to the load current, and the first switch circuit is caused to perform an operation including a time period for the on-off operation and a time period for setting an off state according to the count signal.

6. The control circuit according to claim 1, further comprising:
   a switching controller configured to generate a pulse signal based on a comparison result between a feedback voltage according to the output voltage and a third reference voltage set according to a target voltage of the output voltage;
   a first driver circuit configured to generate a first control signal for performing on-off control on the first switch circuit according to the pulse signal;
   a second driver circuit configured to generate a second control signal for performing on-off control on the second switch circuit according to the pulse signal; and
   a voltage generation circuit configured to generate a bias voltage to be supplied to power supply terminals of the first driver circuit and the second driver circuit,
   wherein if the feedback voltage becomes lower than a fourth reference voltage after the power supply stop signal is input, the voltage generation circuit is configured to stop generating the bias voltage.

7. A control circuit of a power supply generating an output voltage from an input voltage by performing on-off control on a first switch circuit that is turned on for accumulating energy in an induction element and on a second switch circuit that is turned on for discharging the energy accumulated in the induction element to a load coupled to an output terminal, the control circuit comprising:
   a detection circuit configured to detect a load current flowing into the load; and
   a setting circuit configured to set switching operations on the first switch circuit and the second switch circuit according to the load current, wherein the setting circuit is configured to:
   cause the first switch circuit and the second switch circuit to be in an off state over a period of time from when a power supply stop signal is input from an outside device to when the output voltage gradually decreases to a certain voltage value, if the load current at a time when the power supply stop signal is input from the outside device is in a first range, and
   cause, over the period of time from when the power supply stop signal is input to when the output voltage gradually decreases to the certain voltage value, the first switch circuit to perform an operation including a time period for an on-off operation and a time period for setting an off state based on the output voltage while causing the second switch circuit to perform an on-off operation, if the load current is lower than a second reference value that is a lower limit of the first range.

8. The control circuit according to claim 7, wherein the detection circuit includes an amplifier circuit that generates an amplified voltage acquired by amplifying a potential difference between both terminals of a sense resistor inserted between and coupled to the output terminal and the load.

9. The control circuit according to claim 8,
   wherein the detection circuit further includes:
   a first comparator circuit configured to compare a first reference voltage for setting the upper limit of the first range with the amplified voltage, and
   a second comparator circuit configured to compare a second reference voltage for setting the lower limit of the first range with the amplified voltage, and
   wherein the setting circuit is configured to set the switching operations on the first switch circuit and the second switch circuit according to an output signal of the first comparator circuit and an output signal of the second comparator circuit.

10. The control circuit according to claim 7, wherein the setting circuit includes a counter circuit configured to generate a count signal acquired by frequency-dividing a period signal having a frequency identical to a switching frequency of the first switch circuit at a division ratio according to the load current, and the first switch circuit is caused to perform an operation including a time period for the on-off operation and a time period for setting an off state according to the count signal.

11. The control circuit according to claim 7, further comprising:
   a switching controller configured to generate a pulse signal based on a comparison result between a feedback voltage according to the output voltage and a third reference voltage set according to a target voltage of the output voltage;
   a first driver circuit configured to generate a first control signal for performing on-off control on the first switch circuit according to the pulse signal;
   a second driver circuit configured to generate a second control signal for performing on-off control on the second switch circuit according to the pulse signal; and
   a voltage generation circuit configured to generate a bias voltage to be supplied to power supply terminals of the first driver circuit and the second driver circuit,
   wherein if the feedback voltage becomes lower than a fourth reference voltage after the power supply stop signal is input, the voltage generation circuit is configured to stop generating the bias voltage.

12. The control circuit according to claim 11, wherein when the load current is higher than the first range, the switching controller is configured to generate the pulse signal based on a comparison result between the feedback voltage and a fifth reference voltage that is lower than the third reference voltage.

13. The control circuit according to claim 11, further comprising:
   a first invalidation circuit configured to be provided between the switching controller and the first driver circuit, and configured to invalidate the pulse signal according to the load current in a time period in which the power supply stop signal is input and then generation of the bias voltage is stopped; and
a second invalidation circuit configured to be provided between the switching controller and the second driver circuit, and configured to invalidate the pulse signal according to the load current in a time period in which the power supply stop signal is input and then generation of the bias voltage is stopped.

14. A power supply device comprising:
a first switch circuit configured to be turned on for accumulating energy in an induction element;
a second switch circuit configured to be turned on for discharging the energy accumulated in the induction element to a load coupled to an output terminal; and
a control circuit configured to perform on-off control on the first switch circuit and the second switch circuit, wherein the control circuit includes:
a detection circuit configured to detect a load current flowing into the load; and
a setting circuit configured to set switching operations on the first switch circuit and the second switch circuit according to the load current, wherein:
when a power supply stop signal is input from an outside device, if the load current is in a first range, the setting circuit is configured to cause both the first switch circuit and the second switch circuit to be in an off state over a period of time from when the power supply stop signal is input from the outside device to when the output voltage gradually decreases to a certain voltage value, and
when the power supply stop signal is input from the outside device, if the load current is higher than a first reference value that is an upper limit of the first range, the setting circuit is configured to perform an on-off operation on the first switch circuit based on an output voltage generated at the output terminal and cause the second switch circuit to be in the off state over the period of time from when the power supply stop signal is input to when the output voltage gradually decreases to the certain voltage value.

15. An electronic apparatus comprising:
a power supply including:
a first switch circuit configured to be turned on to accumulate energy in an induction element,
a second switch circuit configured to be turned on to discharge the energy accumulated in the induction element to a load coupled to an output terminal, and
a control circuit configured to perform on-off control on the first switch circuit and the second switch circuit; and
an internal circuit to which an output voltage of the power supply is supplied,
wherein the control circuit of the power supply includes:
a detection circuit configured to detect a load current flowing into the load; and
a setting circuit configured to set switching operations on the first switch circuit and the second switch circuit according to the load current, wherein:
when a power supply stop signal is input from an outside device, if the load current is in a first range, the setting circuit is configured to cause the first switch circuit and the second switch circuit to be in an off state over a period of time from when the power supply stop signal is input from the outside device to when the output voltage gradually decreases to a certain voltage value, and,
when the power supply stop signal is input from the outside device, if the load current is higher than a first reference value that is an upper limit of the first range, the setting circuit performs an on-off operation on the first switch circuit based on the output voltage and causes the second switch circuit to be in the off state over the period of time from when the power supply stop signal is input to when the output voltage gradually decreases to the certain voltage value.

16. A control method of a power supply configured to produce an output voltage from an input voltage by performing on-off control on a first switch circuit that is turned on for accumulating energy in an induction element and on a second switch circuit that is turned on for discharging the energy accumulated in the induction element to a load coupled to an output terminal, the control method comprising:
detecting a load current flowing into the load when a power supply stop signal is input from an outside device;
if the load current is in a first range, causing both the first switch circuit and the second switch circuit to be in an off state over a period of time from when the power supply stop signal is input from the outside device to when the output voltage gradually decreases to a certain voltage value; and
if the load current is higher than a first reference value that is an upper limit of the first range, performing an on-off operation on the first switch circuit based on the output voltage and causing the second switch circuit to be in the off state over the period of time from when the power supply stop signal is input to when the output voltage gradually decreases to the certain voltage value.

17. A power supply device comprising:
a first switch circuit configured to be turned on for accumulating energy in an induction element;
a second switch circuit configured to be turned on for discharging the energy accumulated in the induction element to a load connected to an output terminal; and
a control circuit configured to perform on-off control on the first switch circuit and the second switch circuit, wherein the control circuit includes:
a detection circuit configured to detect a load current flowing into the load, and
a setting circuit configured to set switching operations on the first switch circuit and the second switch circuit according to the load current, wherein:
when a power supply stop signal is input, if the load current is in a first range, the setting circuit is configured to cause both the first switch circuit and the second switch circuit to be in an off state over a period of time from when the power supply stop signal is input from the outside device to when the output voltage gradually decreases to a certain voltage value, and
when the power supply stop signal is input from the outside device, if the load current is higher than a first reference value that is an upper limit of the first range, the setting circuit is configured to perform an on-off operation on the first switch circuit based on an output voltage generated at the output terminal and cause the second switch circuit to be in the off state over the period of time from when the power supply stop signal is input to when the output voltage gradually decreases to the certain voltage value.

18. The power supply device according to claim 17, wherein if the load current at a time when the power supply stop signal is input is lower than a second reference value that is a lower limit of the first range, the setting circuit is configured to perform control based on the output voltage such that a number of on-off operations of the first switch circuit is smaller than a number of on-off operations of the second switch circuit.

* * * * *